United States Patent
Iwamoto et al.

(10) Patent No.: US 12,043,159 B2
(45) Date of Patent: Jul. 23, 2024

(54) RACK AND DELIVERY VEHICLE INCLUDING THE SAME

(71) Applicant: TOYOTA JIDOSHA KABUSHIKI KAISHA, Toyota (JP)

(72) Inventors: Kunihiro Iwamoto, Nagakute (JP); Yutaro Takagi, Tokyo (JP); Yuta Itozawa, Nagoya (JP); Hirotaka Komura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 336 days.

(21) Appl. No.: 17/564,442

(22) Filed: Dec. 29, 2021

(65) Prior Publication Data

US 2022/0250528 A1 Aug. 11, 2022

(30) Foreign Application Priority Data

Feb. 9, 2021 (JP) .................................. 2021-018764

(51) Int. Cl.
*B60P 3/00* (2006.01)
*B60P 1/64* (2006.01)
*E05B 47/00* (2006.01)
*E05B 65/46* (2017.01)

(52) U.S. Cl.
CPC ............. *B60P 3/007* (2013.01); *B60P 1/6481* (2013.01); *B60P 1/649* (2013.01); *E05B 47/0002* (2013.01); *E05B 65/46* (2013.01)

(58) Field of Classification Search
CPC ......... B60P 3/007; B60P 1/6481; B60P 1/649; E05B 65/46
See application file for complete search history.

(56) References Cited

U.S. PATENT DOCUMENTS

| | | | | |
|---|---|---|---|---|
| 1,601,990 | A | * 10/1926 | Wann | ...................... B60P 3/007 296/3 |
| 2,574,692 | A | * 11/1951 | Davidson | ............... B25H 3/028 206/499 |
| 4,191,436 | A | * 3/1980 | Cherry | .................... E05B 65/46 312/333 |
| 4,451,111 | A | * 5/1984 | Munroe | ................. A47B 67/04 312/3 |

(Continued)

FOREIGN PATENT DOCUMENTS

| | | |
|---|---|---|
| JP | H05-270618 A | 10/1993 |
| JP | H06-211324 A | 8/1994 |

(Continued)

*Primary Examiner* — Erez Gurari
(74) *Attorney, Agent, or Firm* — Oliff PLC (57) ABSTRACT

A rack includes a casing and a plurality of pairs of supports that is provided inside the casing so as to extend in a depth direction and arrayed at regular intervals in an up-down direction. The rack can house all storage boxes of two or more prespecified sizes while supporting the storage boxes so as to be slidable along the respective pairs of supports. Sensors that detect objects are provided one between each two pairs of supports that are adjacent to each other in the up-down direction among the pairs of supports. When storage boxes of a smallest size are housed in the rack so as to be closest to one another in the up-down direction, the sensors are located in clearances between the storage boxes of the smallest size in the up-down direction.

5 Claims, 6 Drawing Sheets

(56) References Cited

U.S. PATENT DOCUMENTS

| | | | | |
|---|---|---|---|---|
| 5,016,948 A | * | 5/1991 | Welch | B65H 35/002 |
| | | | | D34/21 |
| 5,069,511 A | * | 12/1991 | Swets | E05B 65/467 |
| | | | | 312/216 |
| 6,988,626 B2 | * | 1/2006 | Varghese | G06F 1/16 |
| | | | | 312/334.4 |
| 9,010,830 B2 | * | 4/2015 | Hanley | B60R 11/00 |
| | | | | 296/24.44 |
| 9,834,149 B2 | * | 12/2017 | Hanley | A47B 57/585 |
| 11,345,269 B2 | * | 5/2022 | Merta | G07F 17/12 |
| 2004/0135477 A1 | * | 7/2004 | Price | A61G 12/001 |
| | | | | 312/249.11 |
| 2006/0216966 A1 | * | 9/2006 | Selek | B60P 1/6418 |
| | | | | 439/76.2 |
| 2010/0057245 A1 | * | 3/2010 | Hironaka | G06Q 10/08 |
| | | | | 700/214 |
| 2010/0108622 A1 | * | 5/2010 | Gabriel | A01K 1/031 |
| | | | | 211/85.17 |
| 2011/0234419 A1 | * | 9/2011 | Churbock | G16H 40/60 |
| | | | | 340/691.1 |
| 2014/0184038 A1 | * | 7/2014 | Shoenfeld | E05B 65/46 |
| | | | | 312/209 |
| 2014/0354001 A1 | * | 12/2014 | Hanley | A47B 57/10 |
| | | | | 296/24.44 |
| 2017/0079431 A1 | * | 3/2017 | Nilsson | A47B 55/00 |
| 2019/0247276 A1 | | 8/2019 | Mongrenier | |
| 2022/0105855 A1 | * | 4/2022 | Iwamoto | B60P 1/52 |
| 2022/0250528 A1 | * | 8/2022 | Iwamoto | B60P 9/00 |
| 2022/0258658 A1 | * | 8/2022 | Iwamoto | B60P 1/649 |
| 2022/0363475 A1 | * | 11/2022 | Iwata | B65G 1/0492 |
| 2022/0371499 A1 | * | 11/2022 | Perez | B60P 1/52 |

FOREIGN PATENT DOCUMENTS

| | | |
|---|---|---|
| JP | 2001-002212 A | 1/2001 |
| JP | 2017-027165 A | 2/2017 |
| JP | 2020-500041 A | 1/2020 |

* cited by examiner

RACK AND DELIVERY VEHICLE INCLUDING THE SAME

CROSS-REFERENCE TO RELATED APPLICATION

This application claims priority to Japanese Patent Application No. 2021-018764 filed on Feb. 9, 2021, incorporated herein by reference in its entirety.

BACKGROUND

1. Technical Field

The present disclosure relates to a rack and a delivery vehicle including this rack.

2. Description of Related Art

Japanese Unexamined Patent Application Publication No. 6-211324 (JP 6-211324 A) discloses a rack that can house pallets of two or more sizes.

SUMMARY

One problem with JP 6-211324 A is that the sizes of pallets to be housed in the rack need to be input by a worker, which takes time and effort.

Having been contrived in view of this situation, the present disclosure provides a rack that can house storage boxes of two or more sizes as well as can easily detect the sizes of storage boxes housed therein.

A rack according to one aspect of the present disclosure is a rack including a casing and a plurality of pairs of supports that is provided inside the casing so as to extend in a depth direction and arrayed at regular intervals in an up-down direction. The rack is able to house all storage boxes of two or more prespecified sizes while supporting the storage boxes so as to be slidable along the respective pairs of supports. Sensors that detect objects are provided one between each two pairs of supports that are adjacent to each other in the up-down direction among the pairs of supports. When storage boxes of a smallest size are housed in the rack so as to be closest to one another in the up-down direction, the sensors are located in clearances between the storage boxes of the smallest size in the up-down direction.

A delivery vehicle according to one aspect of the present disclosure includes a rack having a casing and a plurality of pairs of supports that is provided inside the casing so as to extend in a depth direction and arrayed at regular intervals in an up-down direction. The rack is able to house all returnable containers of two or more prespecified sizes while supporting the returnable containers so as to be slidable along the respective pairs of supports. The rack has sensors that detect objects and are provided one between each two pairs of supports that are adjacent to each other in the up-down direction among the pairs of supports. When returnable containers of a smallest size are housed in the rack so as to be closest to one another in the up-down direction, the sensors are located in clearances between the returnable containers of the smallest size in the up-down direction.

Thus, in one aspect of the present disclosure, the sensors that detect objects are provided one between each two pairs of supports that are adjacent to each other in the up-down direction among the pairs of supports. When the storage boxes of the smallest size are housed in the rack so as to be closest to one another in the up-down direction, the sensors are located in the clearances between the storage boxes of the smallest size in the up-down direction. Therefore, when the storage boxes are housed one on each pair of supports, the sizes of the storage boxes can be determined based on detection results of the sensors.

The rack and the delivery vehicle may further include, for each of the pairs of supports, a lock mechanism that locks the storage box when the storage box is housed, and the lock mechanism may detect that the storage box has been locked. In this configuration, on which supports a storage box has been housed can be determined.

Protrusions that protrude from the storage box toward outer sides in a width direction may slide over each of the pairs of supports. Each of the lock mechanisms may be provided so as to face corresponding one of the pairs of supports and slide on the protrusion of the storage box. A sliding surface of each of the pairs of supports that slides on the protrusion and a sliding surface of each of the lock mechanisms that slides on the protrusion may be both provided with rollers. This configuration can reduce the coefficient of friction between the protrusion of the storage box and each of the support and the lock mechanism, as well as can mitigate generation of abrasion dust resulting from sliding of the protrusion.

Identification information may be attached to each of the storage boxes, and the rack and the delivery vehicle may further include, for each of the pairs of supports, a reader that reads the identification information. In this configuration, on which supports a storage box has been housed can be determined.

The delivery vehicle may be an autonomous vehicle. This configuration can reduce delivery costs.

The present disclosure can provide a rack that can house storage boxes of two or more sizes as well as can easily detect the sizes of the storage boxes housed therein.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Specific embodiments will be described in detail below with reference to the drawings. The same or corresponding elements in the drawings are denoted by the same reference signs, and overlapping description thereof will be omitted as necessary to clarify the description.

First Embodiment

Configuration of Delivery Management System

Figure 1:
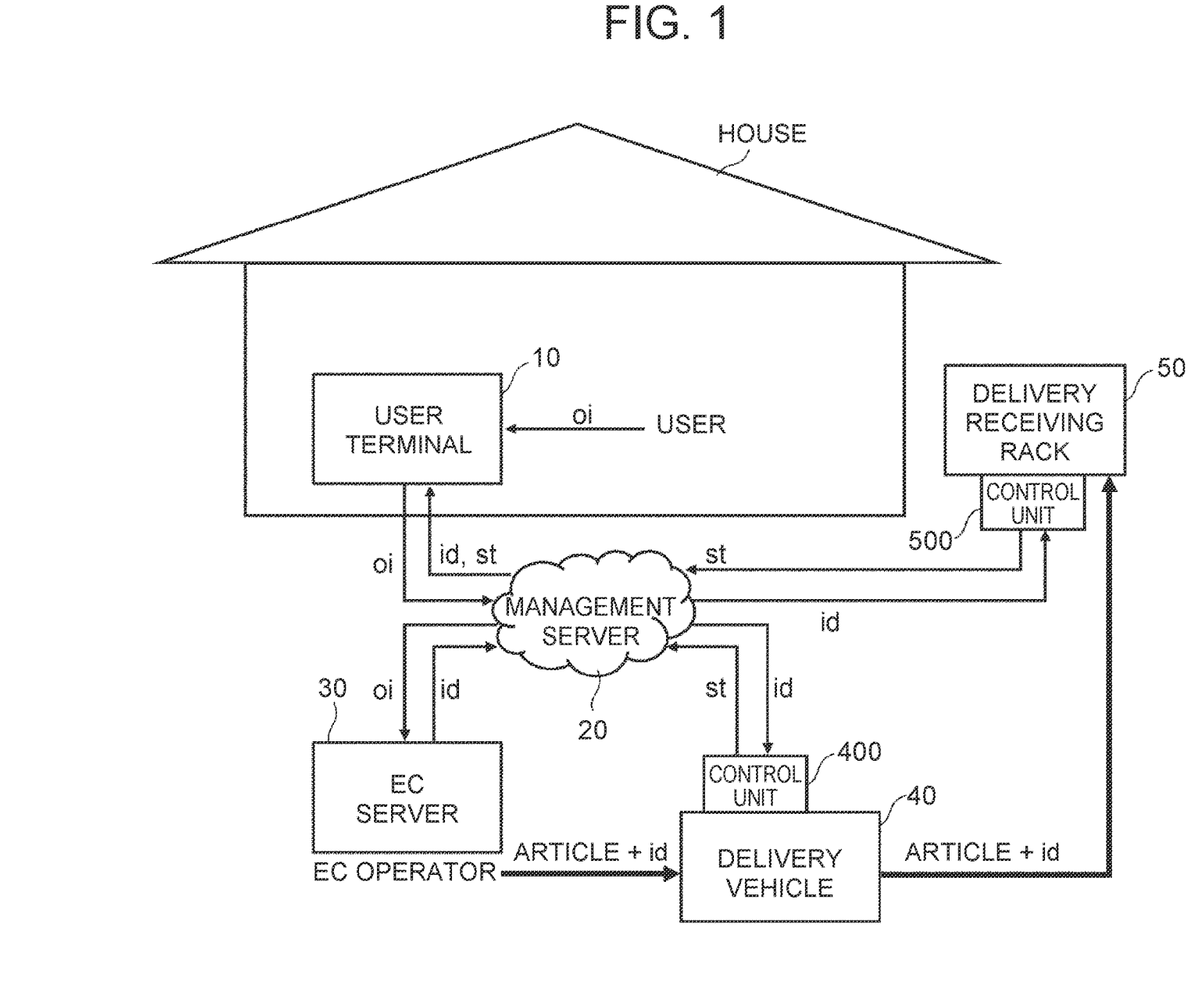
FIG. 1 is a block diagram of a delivery management system using a delivery vehicle and a delivery rack according to a first embodiment.

First, a delivery management system using a delivery vehicle and a delivery rack according to a first embodiment will be described with reference to FIG. 1. FIG. 1 is a block diagram of the delivery management system using the delivery vehicle and the delivery rack according to the first embodiment.

This delivery management system is a delivery management system that manages transportation of ordered articles by means of a computer. In the delivery management system according to this embodiment, articles are delivered by being housed in returnable delivery containers of two or more prespecified sizes, for example, according to the sizes of the articles. The returnable containers are not limited to any type of containers; for example, the returnable containers are made of plastics, cardboard, wood, or metal and repeatedly used. The returnable container is one form of a storage box.

As shown in FIG. 1, the delivery management system according to this embodiment includes a user terminal 10, a management server 20, an electronic commerce (EC) server 30, a delivery vehicle 40, and a delivery rack 50. Here, the delivery vehicle 40 includes a control unit 400 that performs various modes of control related to the delivery vehicle 40. Similarly, the delivery rack 50 includes a control unit 500 that performs various modes of control related to the delivery rack 50.

The user terminal 10, the management server 20, the EC server 30, and the control units 400, 500 each include, for example, an arithmetic unit, such as a central processing unit (CPU), and a storage unit, such as a random-access memory (RAM) or a read-only memory (ROM), that stores various control programs, data, etc. Thus, each of the management server 20, the EC server 30, and the control units 400, 500 functions as a computer and performs processes to be described below based on the various control programs etc.

As shown in FIG. 1, the user terminal 10 is a communication terminal that is communicably connected to the management server 20 via wire or wirelessly. While the user terminal 10 is not particularly limited as long as it can communicate with the management server 20, the user terminal 10 is, for example, a portable communication terminal, such as a smartphone or a tablet terminal, or a personal computer (PC) installed indoors.

The user terminal 10 is located inside a residential space of a house in FIG. 1, but may instead be located outdoors or at an indoor place other than the residential space. In this specification, the term "house" covers an apartment complex, an office building, etc., and the term "residential space" covers an office space.

As shown in FIG. 1, a user inputs order information oi into the user terminal 10. The order information oi is sent from the user terminal 10 to the management server 20. The order information oi is information about an article to be delivered, and includes pieces of information such as the name of the article, a quantity, desired time and date of delivery, and a delivery destination (address).

The management server 20 is a server that manages the delivery management system. As shown in FIG. 1, the management server 20 is communicably connected to the user terminal 10, the EC server 30, the delivery vehicle 40, and the control unit 500 of the delivery rack 50. The management server 20 is, for example, a cloud server. The management server 20 sends the order information oi received from the user terminal 10 to the EC server 30.

Further, the management server 20 receives order identification information id issued by the EC server 30 and sends this order identification information id to the user terminal 10, the delivery vehicle 40, and the control unit 500 of the delivery rack 50. The order identification information id is information for identifying an article to be delivered, and is, for example, an order number. Further, the management server 20 receives status information st showing a delivery status of an article from the delivery vehicle 40 and the control unit 500 of the delivery rack 50, and sends this status information st to the user terminal 10. The status information st includes, as the delivery status of the article, information such as "waiting for delivery," "being delivered," or "already delivered."

The EC server 30 is, for example, a server that constitutes an EC site run by an EC operator on the Internet. As shown in FIG. 1, the EC server 30 is communicably connected to the management server 20, and issues the order identification information id according to the order information of received from the management server 20 and sends this order identification information id to the management server 20.

Figure 2:
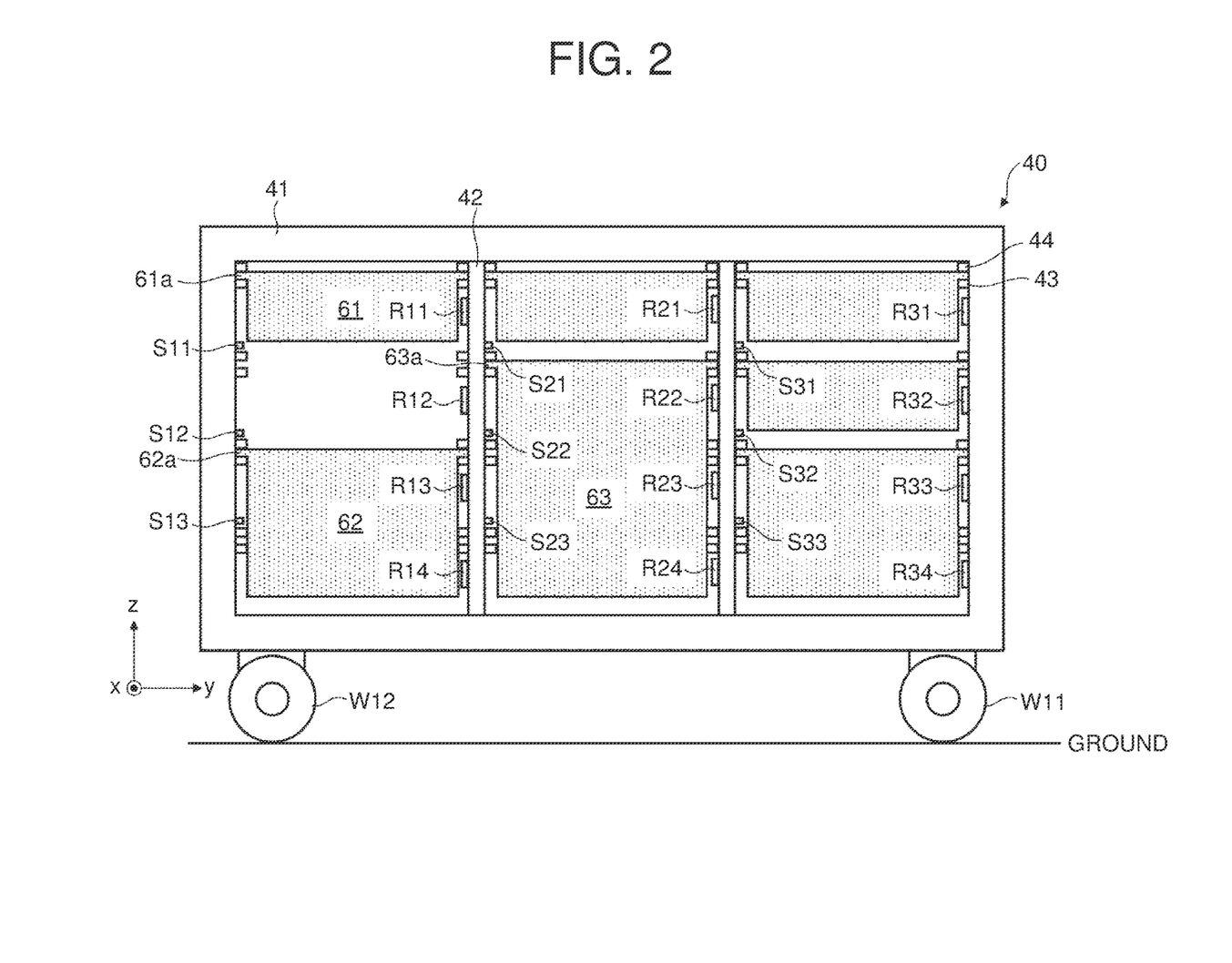
FIG. 2 is a schematic side view of the delivery vehicle according to the first embodiment.

The delivery vehicle 40 is a vehicle that carries articles. Here, FIG. 2 is a schematic side view of the delivery vehicle according to the first embodiment. As shown in FIG. 2, the delivery vehicle 40 includes a casing (vehicle body) 41, and a plurality pairs of rails (supports) 43 that is provided inside the casing 41 so as to extend in a depth direction (x-axis direction) and arrayed at regular intervals in a height direction (z-axis direction).

Thus, the delivery vehicle 40 includes a rack that can house all returnable containers 61 to 63 of two or more prespecified sizes along the respective pairs of rails 43. As such, the delivery vehicle 40 can streamline the delivery using the returnable containers 61 to 63 of two or more prespecified sizes. The right-handed xyz orthogonal coordinate system shown in FIG. 2 is for the convenience of describing positional relationships among components. Normally, a z-axis positive direction is a vertically upward direction and an xy-plane is a horizontal plane. In FIG. 2 that is a side view, the returnable containers 61 to 63 are indicated by hatching to help understanding.

The delivery vehicle 40 is, for example, an autonomous (driverless) vehicle. Using an autonomous vehicle can reduce delivery costs. For example, the delivery vehicle 40 can travel on sidewalks and the like, let alone roads, and can deliver the returnable containers 61 to 63 to the vicinity of the delivery rack 50. When the delivery vehicle 40 becomes unable to travel autonomously, for example, the delivery vehicle 40 may be remotely operated. A delivery person may drive the delivery vehicle 40, and may deliver the articles, i.e., the returnable containers 61 to 63 from the delivery vehicle 40 to the delivery rack 50.

For example, the articles with the order identification information id attached thereto are housed in the returnable containers 61 to 63 and then these articles are delivered. The order identification information id attached to the articles is, for example, a character, symbol, barcode, two-dimensional code, or radio frequency identifier (RFID) that can be read by a reader (not shown). The order identification information id may be attached to the returnable containers 61 to 63 instead of the articles.

Here, identification information is attached also to each of the returnable containers 61 to 63, and each of the returnable containers 61 to 63 is identified by the identification information. As shown in FIG. 2, the delivery vehicle 40 includes readers R11 to R14, R21 to R24, R31 to R34 that read the identification information on the returnable containers 61 to 63.

For example, in the management server 20, the order identification information id on articles and identification information on the returnable containers 61 to 63 that house the respective articles are linked with each other and stored. Therefore, the status information st on the articles can be obtained also by tracking the identification information on the returnable containers 61 to 63 that house the respective articles, instead of directly tracking the order identification information id attached to the articles.

Here, as shown in FIG. 1, the returnable containers 61 to 63 housing articles with the order identification information id attached thereto are delivered from the EC operator to the delivery rack 50 at the delivery destination by the delivery vehicle 40. For example, from when the delivery vehicle 40 receives the order identification information id until it receives articles from the EC operator, the status information st showing the delivery status of the articles is "waiting for delivery." Thereafter, the delivery vehicle 40 receives the returnable containers 61 to 63 housing the articles with the order identification information id attached thereto from the EC operator. Then, the status information st switches to "being delivered," for example, as the identification information on the returnable containers 61 to 63 is read by the readers R11 to R14, R21 to R24, and R31 to R34 of the delivery vehicle 40 (see FIG. 2).

As shown in FIG. 1, the control unit 400 of the delivery vehicle 40 is communicably wirelessly connected to the management server 20. The control unit 400 of the delivery vehicle 40 receives the order identification information id from the management server 20 and sends the status information st showing the delivery status of the returnable containers 61 to 63 (i.e., articles) to the management server 20. Details of the configuration of the delivery vehicle 40 shown in FIG. 2 will be described later.

Figure 3:
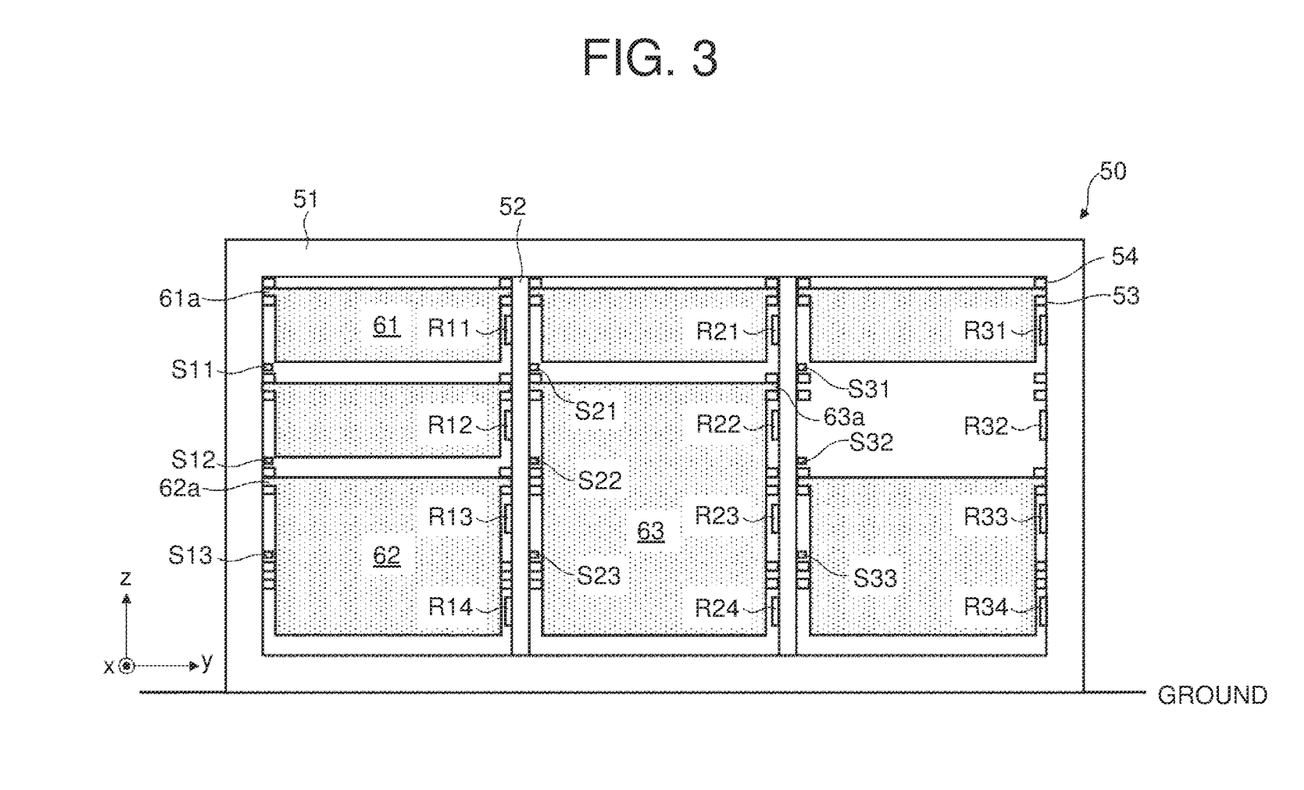
FIG. 3 is a schematic front view of the delivery rack according to the first embodiment.

The delivery rack 50 is a rack that allows the returnable containers 61 to 63 of two or more prespecified sizes to be put in and out of it, and is a rack similar to the rack included in the delivery vehicle 40. Here, FIG. 3 is a schematic front view of the delivery rack according to the first embodiment. As shown in FIG. 3, the delivery rack 50 includes a casing 51 and a plurality of pairs of rails 53 that is provided inside the casing 51 so as to extend in a depth direction (x-axis direction) and arrayed at regular intervals in a height direction (z-axis direction).

Thus, like the rack included in the delivery vehicle 40, the delivery rack 50 is a rack that can house all the returnable containers 61 to 63 of two or more prespecified sizes. As such, the delivery rack 50 can streamline the delivery using returnable containers of two or more prespecified sizes. As shown in FIG. 3, like the delivery vehicle 40, the delivery rack 50 also includes readers R11 to R14, R21 to R24, and R31 to R34 that read the identification information on the returnable containers 61 to 63.

The right-handed xyz orthogonal coordinate system shown in FIG. 3 is also for the convenience of describing positional relationships among components. Normally, a z-axis positive direction is a vertically upward direction and an xy-plane is a horizontal plane. Further, in FIG. 3 that is a front view, the returnable containers 61 to 63 are indicated by hatching to help understanding.

When carrying the returnable containers 61 to 63 into the delivery rack 50, the status information st switches to "already delivered" as the identification information on the returnable containers 61 to 63 is read by the readers R11 to R14, R21 to R24, and R31 to R34 of the delivery rack 50. Here, transfer of the returnable containers 61 to 63 (i.e., articles) from the delivery vehicle 40 to the delivery rack 50 may be performed by a person, such as a caretaker of an apartment complex, or may be performed by a transfer robot (see FIG. 8) that is not shown in FIG. 1.

Further, when an addressee takes out the articles from the returnable containers 61 to 63 housed in the delivery rack 50, the status information st may switch to "already received" or the like as the order identification information id attached to the articles is read. The returnable containers 61 to 63 that have become empty after the articles have been taken out in the delivery rack 50 may be collected by the delivery vehicle 40. In this case, the status information st may switch to "already collected" or the like as the identification information on the returnable containers 61 to 63 is read.

As shown in FIG. 1, the control unit 500 of the delivery rack 50 is communicably wirelessly connected to the management server 20. The control unit 500 of the delivery rack 50 receives the order identification information id from the management server 20 and sends the status information st showing the delivery status of the returnable containers 61 to 63 (i.e., articles) to the management server 20.

Thus, using the status information st, one can learn the availability status, the collection status, etc. of the returnable containers 61 to 63 in the delivery rack 50 (i.e., the availability status of housing spaces in the delivery rack 50). The status information st is not essential. On the other hand, the status information st may be sent also to the EC server 30.

In the example of FIG. 1, the delivery rack 50 is provided outdoors. As an example of outdoor usage, the delivery rack 50 may be installed in the entrance or a corridor of an apartment complex. Further, the delivery rack 50 may be installed in a house, and may be provided indoors.

Alternatively, the delivery rack 50 may be provided so as to extend through an outer wall of a house. This configuration makes it possible to carry the delivered returnable containers 61 to 63 into the delivery rack 50 from outdoors, and to take the returnable containers 61 to 63 out of the delivery rack 50 on an inside of a residential space. In this case, for example, an outer door and an inner door (not shown) that can be opened and closed may be provided on an outdoor side and an indoor side of the delivery rack 50, and an interlock mechanism that prevents the outer door and the inner door from opening at the same time may be provided. This configuration can protect the privacy of people living in the house. Details of the configuration of the delivery rack 50 shown in FIG. 3 will be described later.

As has been described above, the delivery vehicle 40 and the delivery rack 50 according to this embodiment include the pairs of rails 43, 53 that are provided inside the casings so as to extend in the depth direction and arrayed at regular intervals in the height direction. Thus, all the returnable containers 61 to 63 of two or more prespecified sizes can be housed along the respective pairs of rails 43, 53. As a result, delivery using the returnable containers 61 to 63 of two or more prespecified sizes can be streamlined.

Configuration of Delivery Vehicle 40

Next, details of the configuration of the delivery vehicle 40 will be described with reference to FIG. 2. As shown in FIG. 2, the delivery vehicle 40 includes wheels W11, W12, the casing 41, partition plates 42, the rails 43, lock mechanisms 44, sensors S11 to S13, S21 to S23, and S31 to S33, and the readers R11 to R14, R21 to R24, and R31 to R34.

The two pairs of wheels W11, W12 are rotatably fixed on a lower side of the casing 41 and driven by a driving source (not shown), such as a motor.

The casing 41 constitutes the vehicle body of the delivery vehicle 40. In the example shown in FIG. 2, the casing 41 has a configuration in which a top plate provided on a positive side in the z-axis direction, a bottom plate provided on a negative side in the z-axis direction, a front plate provided on a positive side in the y-axis direction, and a back plate provided on a negative side in the y-axis direction are integrally formed. Thus, both lateral sides of the casing 41 are open to allow the returnable containers 61 to 63 to be put in and out. Alternatively, doors that can be opened and closed may be provided on both lateral sides of the casing 41 that are open. Further, the casing 41 may be closed on one lateral side.

As shown in FIG. 2, the partition plates 42 are provided parallel to the front plate and the back plate constituting parts of the casing 41 (i.e., parallel to an xz-plane) so as to extend from one lateral side to the other lateral side of the casing 41. Here, the partition plates 42 are provided such that the interval between the front plate of the casing 41 and the adjacent partition plate 42, the interval between the back plate and the adjacent partition plate 42, and the interval between the partition plates 42 are equal.

In the example of FIG. 2, two partition plates 42 are provided and three rows of housing places for the returnable containers 61 to 63 are provided, but the number of the partition plates 42 is not limited to any number. Alternatively, the partition plates 42 may be omitted and one row of housing places for the returnable containers 61 to 63 may be provided.

As shown in FIG. 2, the pairs of rails 43 are provided on an inner surface of the casing 41 and the partition plates 42 so as to extend in the depth direction (x-axis direction) and arrayed at regular intervals in the height direction (z-axis direction). Here, the rails 43 are provided so as to rise from the inner surface of the casing 41 and the partition plates 42 in substantially perpendicular directions. In the example of FIG. 2, four pairs of rails 43 are provided in each row, and four returnable containers 61 of the smallest size can be housed in each row.

Of course, the number of rails 43 is not limited to any number. Further, since the rails 43 should be able to at least support the returnable containers 61 to 63, the rails 43 may be provided so as to extend discontinuously in the depth direction (x-axis direction). Alternatively, instead of the rails 43, short supports may be disposed so as to line up in the depth direction (x-axis direction).

As shown in FIG. 2, the returnable containers 61 to 63 can be put in and out as protrusions 61a to 63a that protrude from the returnable containers 61 to 63 toward outer sides in the width direction each slide over the corresponding pair of rails 43 that is adjacent to and face the protrusions. Thus, the delivery vehicle 40 includes the rack that can house all the returnable containers 61 to 63 of two or more prespecified sizes while supporting the returnable containers 61 to 63 so as to be slidable along the respective pairs of rails 43.

The lock mechanisms 44 are provided one on an upper side of each pair of rails 43. The lock mechanisms 44 can lock the returnable containers 61 to 63 housed in the delivery vehicle 40 and lids thereof (not shown) onto the casing 41 and thereby prevent the returnable containers 61 to 63 and the articles housed therein from being stolen. Details of the rails 53 and lock mechanisms 54 will be described later.

In this embodiment, the returnable containers 61 to 63 of two or more prespecified sizes are equal in the width in the y-axis direction and the depth in the x-axis direction. However, the returnable containers 61 to 63 are different from one another in the height in the z-axis direction. The height of the returnable container 61 of the smallest size is designed according to the interval between the rails 43 that are adjacent to each other in the z-axis direction. Of course, the height of the returnable container 61 of the smallest size is smaller than the interval between these rails 43. The height of the returnable container 62 of a medium size is designed to be about twice as large as the height of the returnable container 61. The height of the returnable container 63 of the largest size is designed to be about three times as large as the height of the returnable container 61.

Thus, the heights of the returnable containers 61 to 63 of two or more prespecified sizes are designed to be about integral multiples of the interval between the rails 43 that are adjacent to each other in the z-axis direction. While the returnable containers have three sizes in the example shown in FIG. 2, the number of sizes may be two, or four or larger. In the example of FIG. 2, other than the returnable containers 61 to 63, for example, a returnable container with a height about four times that of the returnable container 61 may be separately provided.

Here, each of the returnable containers 61 to 63 is identified by identification information, such as a character, symbol, barcode, two-dimensional code, or radio frequency identifier (RFID), that can be read by the readers R11 to R14, R21 to R24, and R31 to R34. The identification information is directly affixed to each of the returnable containers 61 to 63 or embedded therein. In the example shown in FIG. 2, the identification information (not shown) is attached to a side surface of each of the returnable containers 61 to 63 on the y-axis positive side.

In the row on the y-axis negative side in the delivery vehicle 40 shown in FIG. 2, the four readers R11 to R14 are provided under the respective pairs of rails 43 provided on the partition plate 42. In the central row, the four readers R21 to R24 are provided under the respective pairs of rails 43 provided on the partition plate 42. In the row on the y-axis positive side, the four readers R31 to R34 are provided under the respective rails 43 provided on the casing 41.

By reading the identification information on the returnable containers 61 to 63 by means of the readers R11 to R14, R21 to R24, and R31 to R34, the returnable containers 61 to 63 housed in the delivery vehicle 40 can be identified and the housing places can be detected. Here, the identification information may include the sizes of the returnable containers 61 to 63.

The readers R11 to R14, R21 to R24, and R31 to R34 are not essential.

Further, as shown in FIG. 2, in the delivery vehicle 40 according to this embodiment, nine sensors S11 to S13, S21 to S23, and S31 to S33 that detect objects are provided one between each two pairs of rails 43 that are adjacent to each other in the up-down direction. The sensors S11 to S13, S21 to S23, and S31 to S33 are, for example, non-contact sensors, such as reflection- or transmission-type photo sensors, or proximity sensors. Alternatively, the sensors S11 to S13, S21 to S23, and S31 to S33 may be contact-type sensors, such as limit switches.

Here, when the returnable containers 61 of the smallest size are housed so as to be closest to one another in the up-down direction, the sensors S11 to S13, S21 to S23, S31 to S33 are located in the clearances between the returnable containers 61 of the smallest size in the up-down direction. Thus, when the returnable containers 61 to 63 are housed on the respective pairs of rails 43, the sensors S11 to S13, S21 to S23, and S31 to S33 can determine the sizes of the returnable containers 61 to 63 by detecting the clearances between the returnable containers 61 to 63. Therefore, when the returnable containers 61 to 63 are housed on the respective pairs of rails 43, the sizes of the returnable containers 61 to 63 can be determined based on detection results of the sensors S11 to S13, S21 to S23, S31 to S33.

A case will be considered where the sensors S11 to S13, S21 to S23, and S31 to S33 are disposed at the same positions as the readers R11 to R14, R21 to R24, and R31 to R34, instead of in the clearances between the returnable containers 61 of the smallest size housed adjacent to each other in the up-down direction. In this case, for example, two returnable containers 61 of the smallest size that are housed adjacent to each other in the up-down direction and one returnable container 62 of the medium size cannot be distinguished from each other. Similarly, for example, three returnable containers 61 of the smallest size that are housed adjacent to one another in the up-down direction and one returnable container 63 of the largest size cannot be distinguished from each other. Thus, the sizes of the returnable containers 61 to 63 cannot be determined.

A specific description will be made below with reference to FIG. 2. In the row on the y-axis negative side in the delivery vehicle 40 shown in FIG. 2, the sensor S11 is provided between the rail 43 in the top tier and the rail 43 in the second tier. Similarly, the sensor S12 is provided between the rail 43 in the second tier and the rail 43 in the third tier, and the sensor S13 is provided between the rail 43 in the third tier and the rail 43 in the bottom tier.

In the example shown in FIG. 2, the returnable container 61 of the smallest size is housed on the rails 43 in the top tier of the row on the y-axis negative side. Here, the sensor S11 does not detect any object, so that the control unit 400 can determine that the returnable container housed on the rails 43 in the top tier is the returnable container 61 of the smallest size. That the returnable container 61 is housed on the rails 43 in the top tier can be detected by at least one of the lock mechanism 44 and the reader R11.

Since no returnable container is housed on the rails 43 in the second tier of the row on the y-axis negative side, of course, the sensor S12, does not detect any object.

The returnable container 62 of the medium size is housed on the rails 43 in the third tier of the row on the y-axis negative side. Here, the sensor S13 detects an object, so that the control unit 400 can determine that the returnable container housed on the rails 43 in the third tier is the returnable container 62 of the medium size. That the returnable container 62 is housed on the rails 43 in the third tier can be detected by at least one of the lock mechanism 44 and the reader R13.

In the central row in the delivery vehicle 40 shown in FIG. 2, the sensor S21 is provided between the rail 43 in the top tier and the rail 43 in the second tier. Similarly, the sensor S22 is provided between the rail 43 in the second tier and the rail 43 in the third tier, and the sensor S23 is provided between the rail 43 in the third tier and the rail 43 in the bottom tier.

The returnable container 61 of the smallest size is housed on the rails 43 in the top tier of the central row. Here, the sensor S21 does not detect any object, so that the control unit 400 can determine that the returnable container housed on the rails 43 in the top tier is the returnable container 61 of the smallest size. That the returnable container 61 is housed on the rails 43 in the top tier can be detected by at least one of the lock mechanism 44 and the reader R21.

The returnable container 63 of the largest size is housed on the rails 43 in the second tier of the central row. Here, the sensors S22, S23 detect an object, so that the control unit 400 can determine that the returnable container housed on the rails 43 in the second tier is the returnable container 63 of the largest size. That the returnable container 63 is housed on the rails 43 in the second tier can be detected by at least one of the lock mechanism 44 and the reader R23.

In the row on the y-axis positive side in the delivery vehicle 40 shown in FIG. 2, the sensor S31 is provided between the rail 43 in the top tier and the rail 43 in the second tier. Similarly, the sensor S32 is provided between the rail 43 in the second tier and the rail 43 in the third tier, and the sensor S33 is provided between the rail 43 in the third tier and the rail 43 in the bottom tier.

The returnable containers 61 of the smallest size are housed respectively on the rails 43 in the top tier and the second tier of the row on the y-axis positive side. Here, the sensors S31, S32 do not detect any object, so that the control unit 400 can determine that the returnable containers housed on the rails 43 in the top tier and the second tier are the returnable containers 61 of the smallest size. That the returnable container 61 is housed on the rails 43 in the top tier can be detected by at least one of the lock mechanism 44 and the reader R31. That the returnable container 61 is housed on the rails 43 in the second tier can be detected by at least one of the lock mechanism 44 and the reader R32.

The returnable container 62 of the medium size is housed on the rails 43 in the third tier of the row on the y-axis positive side. Here, the sensor S33 detects an object, so that the control unit 400 can determine that the returnable container housed on the rails 43 in the third tier is the returnable container 62 of the medium size. That the returnable container 62 is housed on the rails 43 in the third tier can be detected by at least one of the lock mechanism 44 and the reader R33.

As described above, in the delivery vehicle 40 according to this embodiment, the sensors S11 to S13, S21 to S23, and S31 to S33 that detect objects are provided one between each two pairs of rails 43 that are adjacent to each other in the up-down direction. Here, when the returnable containers 61 of the smallest size are housed so as to be closest to one another in the up-down direction, the sensors S11 to S13, S21 to S23, and S31 to S33 are located in the clearances between the returnable containers 61 of the smallest size in the up-down direction. Therefore, when the returnable containers 61 to 63 are housed on the respective pairs of rails 43, the control unit 400 can determine the sizes of the returnable containers 61 to 63 based on detection results of the sensors S11 to S13, S21 to S23, and S31 to S33.

As described above, the sizes of the returnable containers 61 to 63 can be learned also by reading the identification information on the returnable containers 61 to 63 by means of the readers R11 to R14, R21 to R24, and R31 to R34. In the delivery vehicle 40 according to this embodiment, even when the identification information cannot be read due to failure of the readers R11 to R14, R21 to R24, and R31 to R34 or failure of the identification information, the sizes of the returnable containers 61 to 63 can be determined by the sensors S11 to S13, S21 to S23, and S31 to S33.

Further, the returnable containers 61 to 63 are housed upside down by mistake can also be detected by the sensors S11 to S13, S21 to S23, and S31 to S33. For example, in FIG. 2, when the returnable container 61 of the smallest size is housed in a correct position on the rails 43 in the second tier of the row on the y-axis negative side, none of the sensors including the sensor S12 detects any object. However, if the returnable container 61 of the smallest size is housed upside down on these rails 43, the sensor S11 that should not detect an object detects an object.

Therefore, the control unit 400 can determine that the returnable container 61 housed on the rails 43 in the second tier is housed upside down. In this case, that the returnable container 61 is housed on the rails 43 in the second tier can be detected by the lock mechanism 44. Thus, that the returnable containers 61 to 63 are housed upside down by mistake can also be detected as the sensors S11 to S13, S21 to S23, and S31 to S33 that should not detect objects when the returnable container 61 is housed in a correct position detect objects.

Details of Rails 43 and Lock Mechanisms 44

Figure 4:
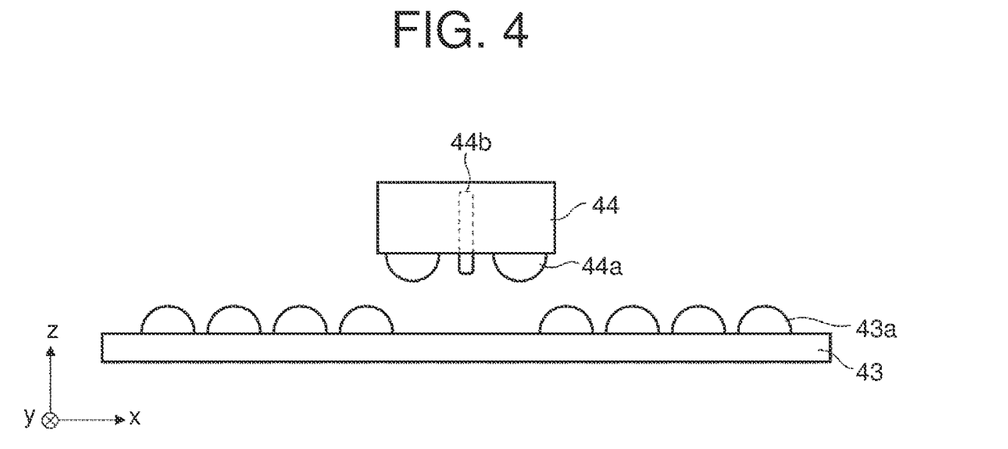
FIG. 4 is a schematic side view showing a rail 43 and a lock mechanism 44.
Figure 5:
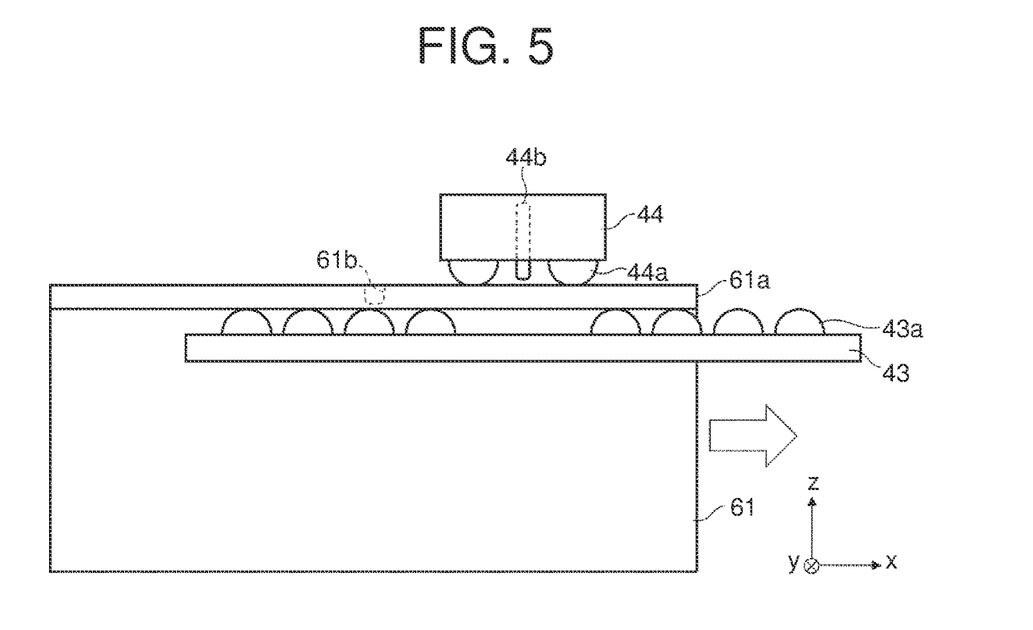
FIG. 5 is a schematic side view showing the rail 43 and the lock mechanism 44.
Figure 6:
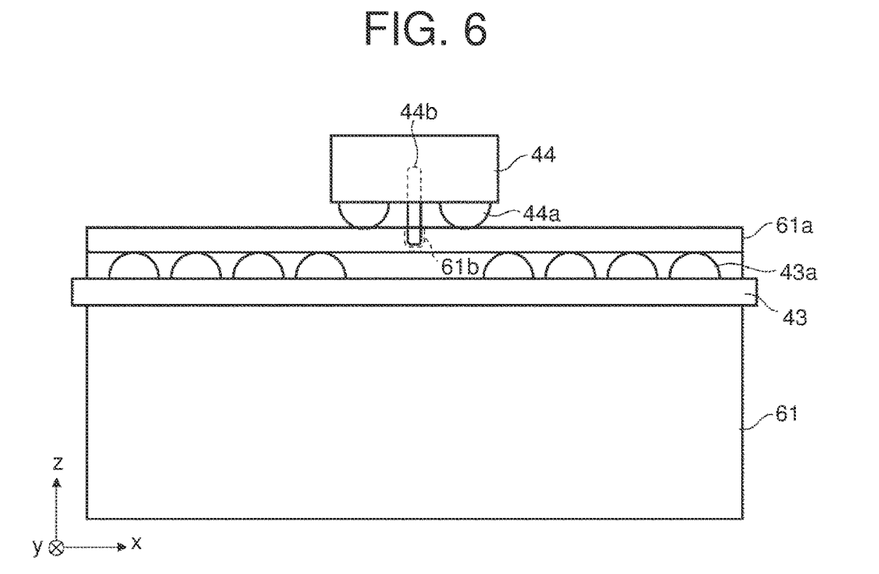
FIG. 6 is a schematic side view showing the rail 43 and the lock mechanism 44.

Here, details of the rails 43 and the lock mechanisms 44 will be described with reference to FIG. 4 to FIG. 6. FIG. 4 to FIG. 6 are schematic side views showing the rail 43 and the lock mechanism 44. FIG. 4 to FIG. 6 show the positional relationship of the rail 43 and the lock mechanism 44 with the returnable container 61 as seen from the y-axis negative side in FIG. 2. The positional relationship of the rail 43 and the lock mechanism 44 with the returnable container 62 is the same. The right-handed xyz orthogonal coordinate system shown in FIG. 4 to FIG. 6 is the same as that of FIG. 2.

As shown in FIG. 4, the rail 43 is a roller rail and includes a plurality of rollers 43a. The rollers 43a are made of plastic, for example. The rollers 43a can reduce the coefficient of friction between the protrusion 61a of the returnable container 61 and the rail 43, as well as can mitigate generation of abrasion dust resulting from sliding of the protrusion 61a.

The lock mechanism 44 shown in FIG. 4 is a solenoid lock and includes rollers 44a and a pin 44b. Each lock mechanism 44 is provided so as to face the corresponding rail 43. As shown in FIG. 5 and FIG. 6, the lock mechanism 44 is provided so as to slide on the protrusion 61a of the returnable container 61, and the rollers 44a are provided on a sliding surface of the lock mechanism 44 that slides on the protrusion 61a. The rollers 44a are made of plastic, for example. The rollers 44a can reduce the coefficient of friction between the protrusion 61a of the returnable container 61 and the lock mechanism 44, as well as can mitigate generation of abrasion dust resulting from sliding of the protrusion 61a.

As shown in FIG. 5, while the returnable container 61 is sliding over the rails 43, the lock mechanism 44 is in a released state. Accordingly, the pin 44b is in a state of having retracted upward. On the other hand, as shown in FIG. 6, when the returnable container 61 stops at a predetermined position on the rail 43, the lock mechanism 44 is activated. Specifically, the pin 44b advances downward and fits into a recess 61b provided in the protrusion 61a of the returnable container 61, so that the returnable container 61 is fixed to the casing 41 and the lid (not shown) of the returnable container 61 is locked. Of course, when the lock mechanism 44 is released, the returnable container 61 becomes movable again as shown in FIG. 5.

The lock mechanism 44 can prevent the returnable container 61 and the article housed therein from being stolen. Further, the control unit 400 shown in FIG. 1 (and FIG. 7) detects that the returnable container 61 has been locked. Thus, the control unit 400 can determine on which rails 43 the returnable container has been housed.

The lock mechanism 44 is not limited to a solenoid lock but may be any lock that can restrict the movement of the returnable container 61 and lock the lid of the returnable container 61. For example, the pin 44b may be mechanically moved. Alternatively, a rotary lock mechanism that does not use the pin 44b may be adopted. In addition, the movement of the returnable container 61 and the lid of the returnable container 61 may be locked separately. Further, the lock mechanism 44 is not essential.

Control System of Delivery Vehicle 40

Figure 7:
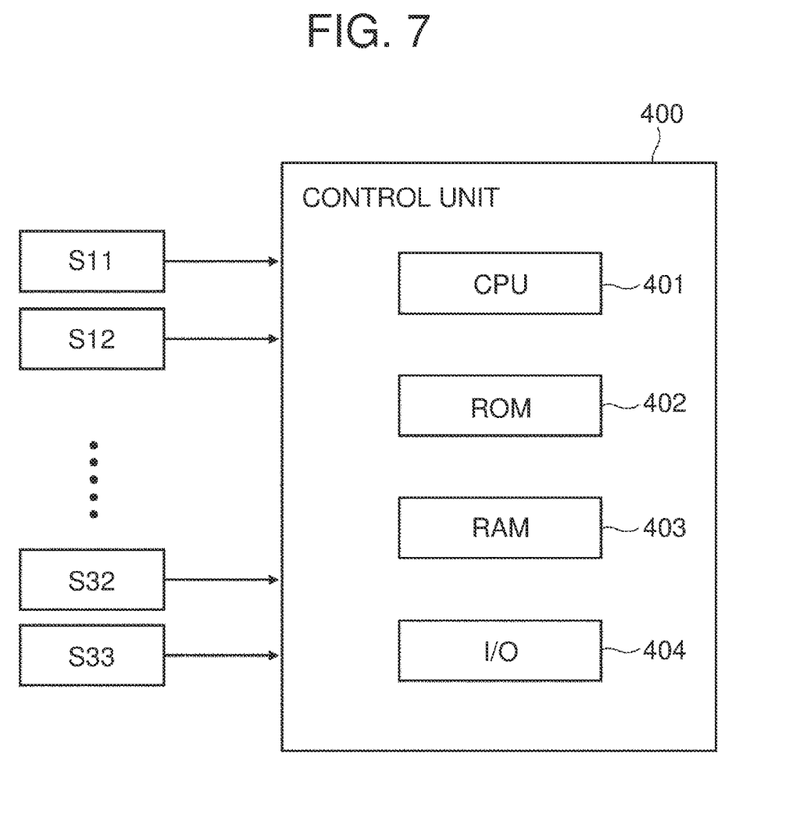
FIG. 7 is a block diagram showing a control system of a delivery vehicle 40.

Next, control of the delivery vehicle 40 will be described with reference to FIG. 7. FIG. 7 is a block diagram showing a control system of the delivery vehicle 40. As shown in FIG. 1, FIG. 2, and FIG. 7, the delivery vehicle 40 includes the sensors S11 to S13, S21 to S23, and S31 to S33 (see FIG. 2) and the control unit 400 (see FIG. 1). The control unit 400 manages the sizes of the returnable containers 61 to 63 housed in the delivery vehicle 40 and the housing places.

As shown in FIG. 7, the control unit 400 can determine the sizes of the returnable containers 61 to 63 housed in the delivery vehicle 40 based on detection results of the sensors S11 to S13, S21 to S23, and S31 to S33 installed in the delivery vehicle 40.

As shown in FIG. 7, the control unit 400 includes, as hardware, a central processing unit (CPU) 401, a read-only memory (ROM) 402, a random-access memory (RAM) 403, and an input-output (I/O) 404. Thus, the control unit 400 functions as a computer and performs various processes based on the various control programs etc.

The CPU 401 is, for example, an arithmetic unit that performs a control process, an arithmetic process, etc. The ROM 402 is, for example, a storage unit that stores control programs, arithmetic programs, etc. executed by the CPU 401. The RAM 403 is a storage unit that temporarily stores processing data etc. The I/O 404 is an input-output device, and receives input of data and signals from an outside and outputs data and signals to the outside.

As shown in FIG. 2, in the delivery vehicle 40 according to this embodiment, the sensors S11 to S13, S21 to S23, S31 to S33 that detect objects are provided one between each two pairs of rails 43 that are adjacent to each other in the up-down direction. Here, when the returnable containers 61 of the smallest size are housed so as to be closest to one another in the up-down direction, the sensors S11 to S13, S21 to S23, and S31 to S33 are located in the clearances between the returnable containers 61 of the smallest size in the up-down direction. Therefore, when the returnable containers 61 to 63 are housed on the respective pairs of rails 43, as shown in FIG. 7, the control unit 400 can determine the sizes of the returnable containers 61 to 63 based on detection results of the sensors S11 to S13, S21 to S23, and S31 to S33.

Configuration of Delivery Rack 50

Next, the configuration of the delivery rack 50 will be described with reference to FIG. 3. As shown in FIG. 3, the delivery rack 50 includes the casing 51, partition plates 52, the rails 53, the lock mechanisms 54, the sensors S11 to S13, S21 to S23, and S31 to S33, and the readers R11 to R14, R21 to R24, and R31 to R34.

The casing 51, the partition plates 52, the rails 53, and the lock mechanisms 54 of the delivery rack 50 correspond to the casing 41, the partition plates 42, the rails 43, and the lock mechanisms 44, respectively, of the delivery vehicle 40 and have the same configurations. The sensors S11 to S13, S21 to S23, and S31 to S33 and the readers R11 to R14, R21 to R24, and R31 to R34 with the same reference signs also have the same configurations as those of the delivery vehicle 40. Therefore, detailed description of these parts will be omitted.

Articles may be housed in empty returnable containers 61 to 63 in the delivery rack 50 and these articles may be sent.

Thus, the delivery rack 50 can be used as both a receiving place and a sending place in delivering articles using the returnable containers 61 to 63.

As shown in FIG. 3, also in the delivery rack 50 according to this embodiment, as in the delivery vehicle 40, the sensors S11 to S13, S21 to S23, and S31 to S33 that detect objects are provided one between each two pairs of rails 53 that are adjacent to each other in the up-down direction. Here, when the returnable containers 61 of the smallest size are housed so as to be closest to one another in the up-down direction, the sensors S11 to S13, S21 to S23, and S31 to S33 are located in the clearances between the returnable containers 61 of the smallest size in the up-down direction. Therefore, when the returnable containers 61 to 63 are housed on the respective pairs of rails 53, the control unit 500 can determine the sizes of the returnable containers 61 to 63 based on detection results of the sensors S11 to S13, S21 to S23, and S31 to S33.

Configuration of Transfer Robot 70

Figure 8:
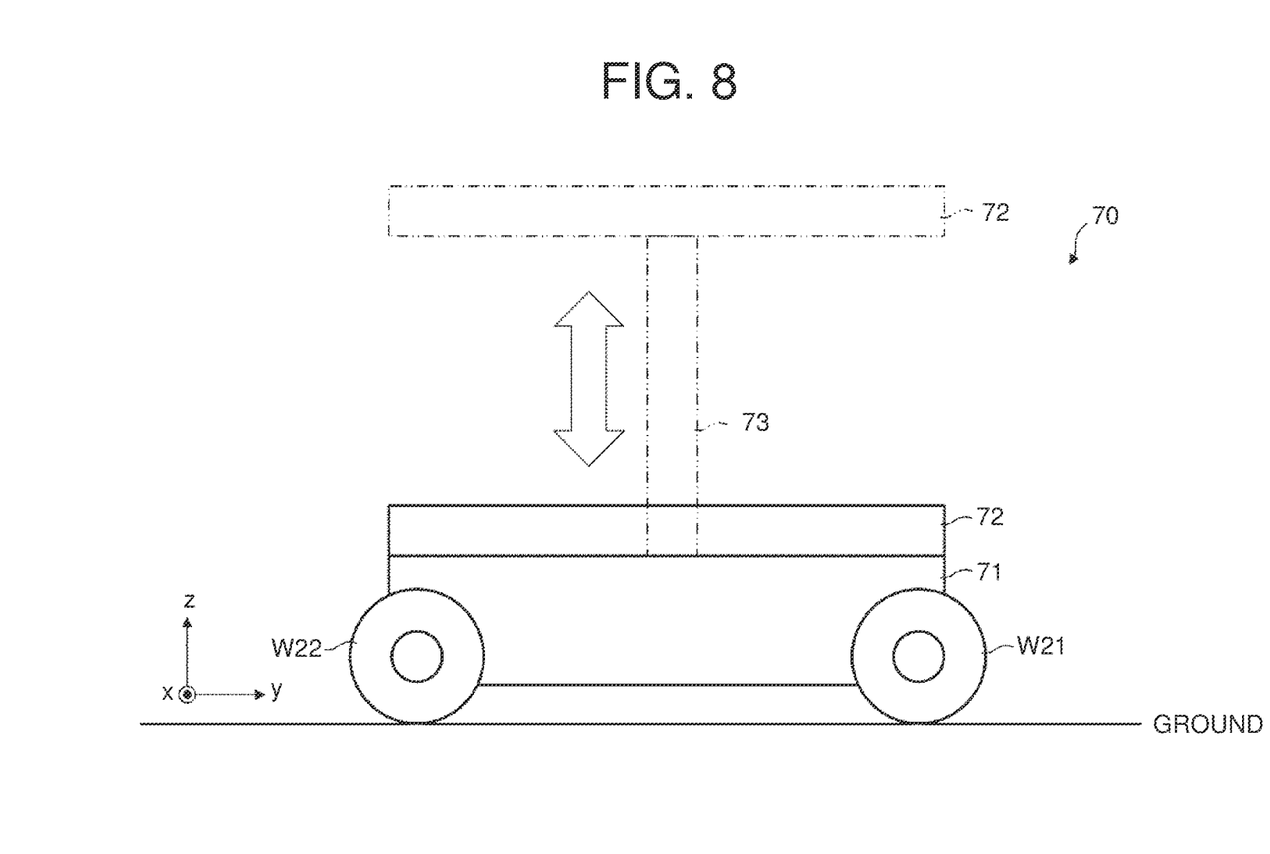
FIG. 8 is a schematic side view of a transfer robot 70.

Next, the configuration of the transfer robot 70 will be described with reference to FIG. 8. FIG. 8 is a schematic side view showing one example of the configuration of the transfer robot 70. The transfer robot 70 is not essential and not shown in FIG. 1.

The transfer robot 70 shown in FIG. 8 is an autonomous vehicle that, after the delivery vehicle 40 arrives in the vicinity of the delivery rack 50, transfers the returnable containers 61 to 63 (i.e., articles) from the delivery vehicle 40 to the delivery rack 50. As shown in FIG. 8, the transfer robot 70 includes wheels W21, W22, a main body 71, a top plate 72, and a pillar 73.

The two pairs of wheels W21, W22 are rotatably fixed under the main body 71 and driven by a driving source (not shown), such as a motor. As shown in FIG. 8, the top plate 72 is coupled to the main body 71 through the extendable pillar 73. The top plate 72 is coupled at an upper end of the pillar 73, and the transfer robot 70 transfers the returnable containers 61 to 63 with the returnable containers 61 to 63 placed on the top plate 72.

The pillar 73 has, for example, a telescopic extending-contracting mechanism and is extended and contracted by a driving source (not shown), such as a motor. As indicated by the outlined arrow in FIG. 8, changing the length of the pillar 73 can change the level of the top plate 72. Therefore, the returnable containers 61 to 63 can be transferred from any housing place in the delivery vehicle 40 to any housing place in the delivery rack 50.

Here, the transfer robot 70 includes a manipulator (not shown), for example, and using the manipulator, moves the returnable containers 61 to 63 from the delivery vehicle 40 to the top plate 72 and thus transfers them. Then, using the manipulator, the transfer robot 70 moves the returnable containers 61 to 63 from the top plate 72 to the delivery rack 50.

In the above examples, the various control programs can be stored using various types of non-transitory computer-readable media and supplied to a computer. Non-transitory computer-readable media include various types of tangible storage media. Examples of non-transitory computer-readable media include a magnetic recording medium (e.g., a flexible disc, magnetic tape, and hard disk drive), a magneto-optical recording medium (e.g., a magneto-optical disk), a CD-ROM, a CD-R, a CD-R/W, and a semiconductor memory (e.g., a mask ROM, programmable ROM (PROM), erasable PROM (EPROM), flash ROM, and RAM). Alternatively, the programs may be supplied to a computer by various types of transitory computer-readable media. Examples of transitory computer-readable media include electric signals, optical signals, and electromagnetic waves. Transitory computer-readable media can supply the programs to a computer through a wire communication channel, such as a wire or an optical fiber, or a wireless communication channel.

The present disclosure is not limited to the above-described embodiment but can be changed as appropriate within a range that does not depart from the gist of the disclosure. For example, the present disclosure is applicable also to a storage rack installed inside a house. Such a storage rack houses normal storage boxes instead of returnable containers. As mentioned above, the returnable container is one form of the storage box.

What is claimed is:

1. A rack comprising:
a casing;
a plurality of pairs of supports that is provided inside the casing so as to extend in a depth direction and arrayed at regular intervals in an up-down direction,
the rack being able to house storage boxes of two or more prespecified sizes while supporting the storage boxes so as to be slidable along the respective pairs of supports;
for each of the pairs of supports, a lock mechanism that locks the storage box when the storage box is housed; and
protrusions that protrude from the storage box toward outer sides in a width direction slide over each of the pairs of supports, wherein:
sensors that detect objects are provided one between each two pairs of supports that are adjacent to each other in the up-down direction among the pairs of supports;
when storage boxes of a smallest size are housed in the rack so as to be closest to one another in the up-down direction, the sensors are located in clearances between the storage boxes of the smallest size in the up-down direction;
each of the lock mechanisms detects that the storage box has been locked and is provided so as to face corresponding one of the pairs of supports and slide on the protrusion of the storage box; and
a sliding surface of each of the pairs of supports that slides on the protrusion and a sliding surface of each of the lock mechanisms that slides on the protrusion are both provided with rollers.

2. The rack according to claim 1, wherein:
identification information is attached to each of the storage boxes; and
the rack further comprises, for each of the pairs of supports, a reader that reads the identification information.

3. A delivery vehicle comprising a rack that has:
a casing;
a plurality of pairs of supports that is provided inside the casing so as to extend in a depth direction and arrayed at regular intervals in an up-down direction,
the rack being able to house returnable containers of two or more prespecified sizes while supporting the returnable containers so as to be slidable along the respective pairs of supports;
for each of the pairs of supports, a lock mechanism that locks the returnable container when the returnable container is housed; and
a protrusion that protrudes from the returnable container toward an outer side in a width direction slides over each of the pairs of supports, wherein:

the rack has sensors that detect objects and are provided one between each two pairs of supports that are adjacent to each other in the up-down direction among the pairs of supports;

when returnable containers of a smallest size are housed in the rack so as to be closest to one another in the up-down direction, the sensors are located in clearances between the returnable containers of the smallest size in the up-down direction;

each of the lock mechanisms detects that the returnable container has been locked and is provided so as to face corresponding one of the pairs of supports and slide on the protrusion of the returnable container; and a sliding surface of each of the pairs of supports that slides on the protrusion and a sliding surface of each of the lock mechanisms that slides on the protrusion are both provided with rollers.

4. The delivery vehicle according to claim 3, wherein:
identification information is attached to each of the returnable containers; and
the delivery vehicle further comprises, for each of the pairs of supports, a reader that reads the identification information.

5. The delivery vehicle according to claim 3, wherein the delivery vehicle is an autonomous vehicle.

* * * * *